United States Patent [19]

Crosby, Jr.

[11] Patent Number: 4,688,758
[45] Date of Patent: Aug. 25, 1987

[54] VALVE APPARATUS

[75] Inventor: Edward L. Crosby, Jr., West Melbourne, Fla.

[73] Assignee: RCA Corporation, W. Melbourne, Fla.

[21] Appl. No.: 669,832

[22] Filed: Nov. 9, 1984

[51] Int. Cl.⁴ .................. F16K 31/04; F16K 31/44
[52] U.S. Cl. ................................ 251/230; 74/575; 251/230; 251/129.04; 251/129.05; 251/129.2; 251/61.1; 251/229; 251/279
[58] Field of Search ............. 251/230, 129.04, 129.05, 251/129.2, 61.1, 229, 279; 21/74, 575

[56]  References Cited

U.S. PATENT DOCUMENTS

| | | | |
|---|---|---|---|
| 802,959 | 10/1905 | Waterman | 251/230 |
| 978,706 | 12/1910 | Davidson | 251/230 |
| 1,426,718 | 8/1922 | DeFlorez | 251/230 |
| 1,710,289 | 4/1929 | Bresler | 251/230 |
| 2,248,495 | 7/1941 | Dupy | 290/40 |
| 2,376,304 | 5/1945 | Anderson | 251/230 |
| 2,431,836 | 12/1947 | Snyder et al. | 171/97 |
| 2,698,413 | 12/1954 | Thompson | 318/265 |
| 2,734,770 | 2/1956 | Kurata | 299/25 |
| 3,174,717 | 3/1965 | Bray | 251/230 |
| 3,203,266 | 8/1965 | Willis et al. | 251/230 |
| 3,345,915 | 10/1967 | Dotto | 251/230 |
| 3,480,034 | 11/1969 | Jerome | 251/230 |
| 4,050,670 | 9/1977 | Borg et al. | 251/229 |
| 4,178,963 | 12/1979 | Riefler | 251/230 |
| 4,261,546 | 4/1981 | Cory et al. | 251/229 |
| 4,527,769 | 7/1985 | Stogner et al. | 251/229 |

OTHER PUBLICATIONS

"Handbook of Maintenance Instructions for Radio Set SCR-624-A," Jun. 24, 1943.
"Stepping Switches," Standard Catalog 601, Communications Instruments, Inc., May 1981.
"Mechanisms and Dynamics of Machinery, 3rd Edition, by H. H. Mabie and F. W. Ocvirk, Published by John Wiley & Sons, New York, 1975.

Primary Examiner—George L. Walton
Attorney, Agent, or Firm—Robert A. Cahill

[57]  ABSTRACT

A rapid acting gas valve for inflated structures employs a slider-crank drive mechanism driven by a pawl and ratchet motor to produce a high closing force in the valve while opening and closing the valve in a partial revolution of the ratchet motor shaft.

14 Claims, 4 Drawing Figures

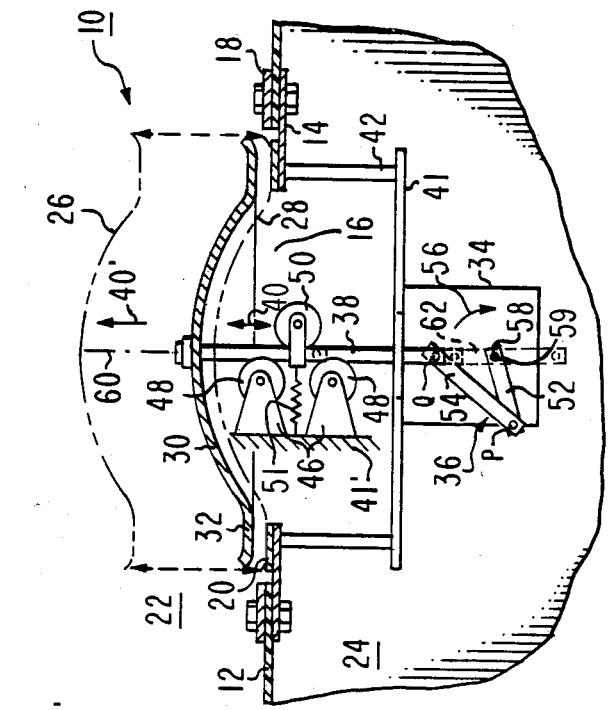
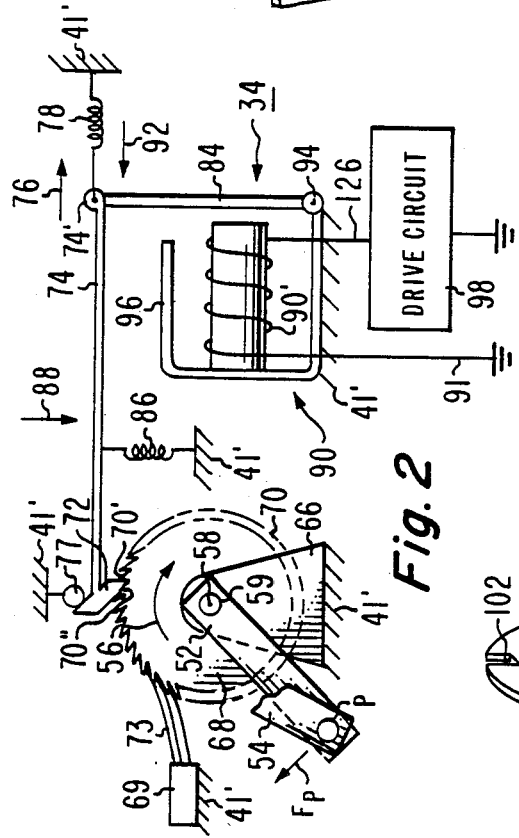
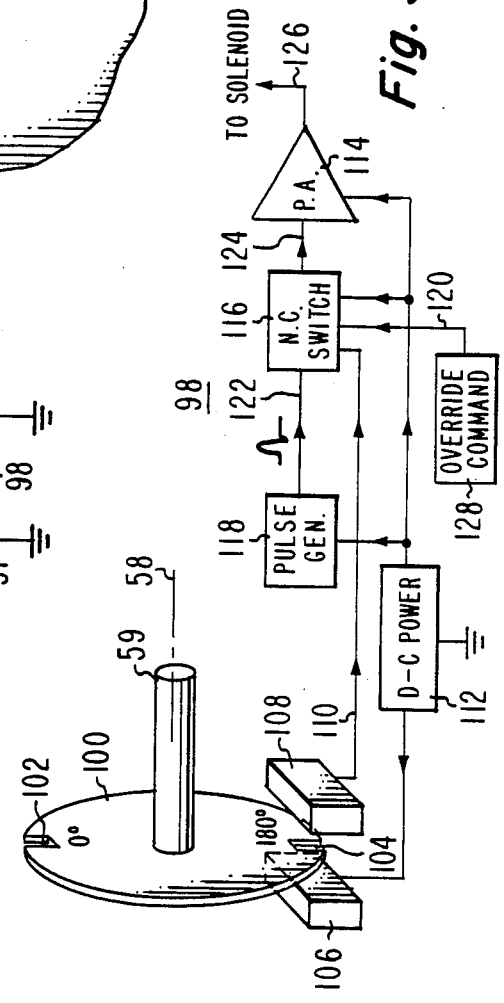
Fig. 1
Fig. 2
Fig. 3

VALVE APPARATUS

This invention relates to valves and, in particular, to valves employed with inflated structures.

In inflated structures, soft materials such as films, coated fabrics, and film-fabric laminates are made semi-rigid by inflation with air or other gases to a low, positive pressure differential, for example, 1–10 iwg (inches, water gauge). Such structures may be double- or single-walled tanks, or "buildings" employed for gas storage, or used in trade or manufacturing. Such structures also include balloons and air ships, more generally referred to as "aerostats," in which the inflatant may be air, a lifting gas such as helium or hydrogen, or both. In aerostats, hull pressure may be controlled by a chamber separate from the lifting gas chamber and may use pressurized air.

An important component of the aerostat system is the gas valve which: (1) vents the lifting gas during overpressure emergencies, (2) vents the lifting gas on a procedural command, or, (3) discharges air to maintain an approximately constant hull pressure over ambient atmospheric pressure during launch-to-flight positions. The overpressure lifting gas venting valve is one which automatically operates in response to variations in ambient atmosphere pressure. The procedural command venting and air discharge for constant hull pressure maintenance are generally fulfilled by electrically operated valves which respond to externally derived signals. These signals usually are "open" and "close" commands from telemetered signals transmitted from the ground, or from on-board transmitters coupled to pressure sensors.

The venting and air discharge systems employ a gas valve which usually comprises a gasket covered rigid ring-like plate which serves as a valve seat and a dome-like movable valve member which, when closed, bears at its outer peripheral surface against the gasket. The ring-like valve seat is secured to the inflated structure over a reinforced port in the structure wall. The valve seat, near its center, supports the operating mechanism for the valve member with slender radially extending spokes which are integral with the valve seat. The spokes are designed for minimum obstruction to gas flow through the valve. The movable valve member has two "at-rest" valve states, opened and closed.

Prior art operating mechanisms used with such gas valves include a screw which carries the valve member and is rotatably driven by a nut rotated by a d.c. motor through a gear box. The opened and closed valve states are determined by mechanically actuated limit switches connected in the motor circuit. Although such switches are provided with adjustment means so that precise seating can be set between the valve member and the valve seat, a zone of indeterminency sometimes remains due to additional undesired rotation of the drive mechanism. That rotation is dependent on temperature sensitive variables, the most significant of which is the viscosity of the motor mechanism lubricant. This additional rotation of the drive shaft normally referred to as "coasting" is not trivial, since ambient operating temperatures for such aerostat systems may vary in a range of +140° F. to −30° F. These temperatures have a significant effect on lubricant viscosities.

An additional problem with screw driven valves is that they generally tend to be slow. Such valves require a relatively high seating force with a reasonable power input. Such a high seating force makes it necessary to use relatively large gear reduction ratios, for example, 1,000:1 or more. The half-cycle time, the time to open or close the valve, for a screw-driven valve employed in an aerostat system may typically be approximately 27 seconds at moderate ambient temperature, for example, about 75° F. An appreciable increase in speed in operation of the valve is obtained usually by significant increases in power input and a substantial increase in the weight of the valve system and its operating mechanism. Both increases are detrimental in an aerostat system because such additional weight and power requirements detract from the available payload weight.

According to the present invention a valve apparatus which is both rapid acting and provides high force at relatively low power comprises a motor having a shaft for rotation about an axis. The motor produces a force relative to the axis of a first magnitude. Valve means having open and closed valve states includes a valve member and a valve seat, the valve member being adapted to engage the seat when moved in a given linear direction. The closed state requires a closing force of a second magnitude substantially greater than the first magnitude, the first magnitude being insufficient to place the valve means in the closed state. Crank means are coupled to the valve means and the motor shaft for translating the relatively low first magnitude force into a valve closing force having a magnitude of at least the second magnitude in the closed valve state and for placing the valve means in the closed and open states in a period less than one revolution of the shaft.

In the drawing:

FIG. 1 is a side elevation partially sectional schematic view of an apparatus in accordance with one embodiment of the present invention;

FIG. 2 is a side elevation view partially schematic of a ratchet motor employed in the embodiment of FIG. 1;

FIG. 3 is a drive circuit schematic diagram employed with the embodiment of FIG. 2.

Figure 4:
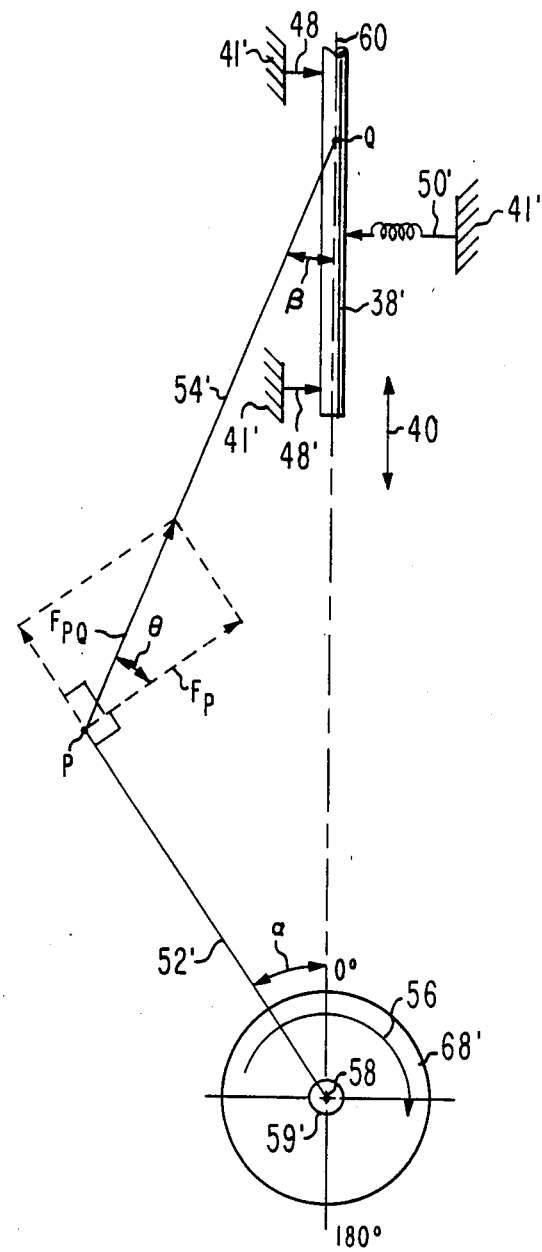
FIG. 4 is a diagram useful for explaining some of the principles of the present invention.

In FIG. 1, valve assembly 10 is employed with an aerostat or other inflatable structure. The inflatable structure has a pliable skin 12 to which is secured a rigid ring 14 forming a central gas port 16. The ring 14 is clamped to skin 12 by clamp 18. The ring 14, skin 12, and clamp 18 are conventional. A valve gasket 20 is secured to ring 14 and faces ambient atmosphere 22.

The skin 12 forms an interior chamber 24 which receives a lifting gas, for example helium, under elevated pressure through a port (not shown). The pressure difference between the chamber 24 and the ambient atmosphere 22 may be about 1–10 iwg, as mentioned above. The valve assembly 10 may be used to vent the lifting gas in chamber 24 upon a procedural command from the ground via telemetry signals through a communication system (not shown) or may discharge air in another system (not shown) to maintain an approximately constant hull pressure on the skin 12 over ambient pressure. The ambient atmosphere 22 pressure varies during travel of the aerostat system from its launch on the ground to its final flight altitude which may be at 10,000 feet above sea level. An undesirable increase in hull pressure may be sensed by sensors (not shown) and signalled to assembly 10 via a control (not shown) for automatically operating a valve such as assembly 10 to vent air from the hull pressure control chamber (not shown).

The valve member 30 rapidly closes upon the ring 14 with exceedingly high forces and with high repetitive accuracy. The nonlinear high closing forces and the relatively rapid action of the valve are produced by a slider-crank drive 36 driven by a relatively low power ratchet motor 34. As will be shown, the slider-crank drive produces its highest drive forces at the extreme positions of the drive connecting arm. Because those extreme positions are reached for each 180° of revolution of the crank arm, those extreme positions are reached relatively quickly. Further, because the slider-crank drive produces relatively high forces with a relatively low power motor, such a drive becomes extremely useful in meeting the requirements of a gas valve of the type described herein. Additionally, when the slider of this embodiment is in its extreme positions, it can withstand extremely high forces precluding slippage due to high pressure surges. All of this will become clearer following the description below.

Valve assembly 10 comprises valve member 30 which may be a dome formed from aluminum sheet material having a circular flange 32 which seats on the gasket 20. Valve stem 38, which may be a circular cylindrical rod, depends from the central regions of member 30 and reciprocates in directions 40 on and parallel to axis 60.

Slider-crank drive 36 connects drive shaft 59 of a ratchet motor 34 to valve stem 38 and thus to member 30. Drive 36 provides accurate and repetitive valve closing action, always seating the valve member in substantially the same closed valve position. Motor 34 moves member 30 in linear direction 40 to open and close the valve. Motor 34, to be described below in connection with the description of FIG. 2, is attached to support 41 secured to ring 14 by a plurality of standoffs 42, only two of which are shown. In the figures, symbols 41" represent different portions of support 41.

Attached to support 41 are guide wheel brackets 46. A guide wheel 48 comprising a grooved pulley is rotatably secured to each bracket 46. A third grooved pulley guide wheel 50 is secured to support 41 by a spring 51 for movably resiliently urging valve stem 38 against the grooves of wheels 48 and 50. Stem 38 moves between and is guided by the wheels 48 and 50 in linear directions 40, rolling the wheels as the stem 38 is moved.

Crank drive 36 includes a crank 52 rotatably driven about axis 58, normal to axis 60, by motor drive shaft 59. Connecting rod 54 is pivotally connected to arm 52 at pivot P and to stem 38 at pivot Q spaced from member 30. The pivot Q should be so located on stem 38 to make connecting rod 54 as long as possible for reasons given below. Pivots P and Q are at opposite ends of connecting rod 54.

In FIG. 1, rotation of crank 52 in response to the rotation of drive shaft 59 in direction 56 from the position shown causes connecting rod 54 to displace valve stem 38 and member 30 in linear direction 40' opening the valve by increasing the spacing between member 30 and gasket 20. The spacing between pivot Q and axis 58 increases until member 30 reaches the full open position at 26 when the pivots Q and P and axis 58 are aligned on axis 60, i.e., when connecting rod 54 is fully extended from crank 52 along axis 60. This is referred herein as the 0° position of crank 52. The crank 52, connecting rod 54, and stem 38 thus form a slider-crank mechanism, stem 38 forming the "slider."

Continued rotation of the crank 52 in direction 56 until crank 52 and rod 54 overlap in the connecting rod fully retracted position (dashed line 62), 180° opposite the 0° position, forces valve member 30 to tightly seat against gasket 20 (broken line 28). This latter position is referred herein as the 180° position of crank 52. This position is repetitively and accurately obtained due to the mechanical relationship of the slider-crank elements.

The valve assembly 10 is relatively rapid acting, to preclude loss of excessive gas from the chamber being pressure controlled, e.g., chamber 24. In this embodiment, the forces applied to the moving valve member 30 of the valve assembly are nonlinear. These forces are greatest at the extremes of the member 30 positions including the point at which the valve member 30 seats upon gasket 20. The forces are lower in the intermediate member 30 positions between the valve full open and full closed states. The greatest actuating forces on this valve assembly are needed to insure the valve is fully closed in the presence of relatively high chamber pressure forces and the lower intermediate forces are tolerable because when the valve member 30 is in the open state little force is needed for valve displacement. The valve is displaced from the open valve position, broken line 26, FIG. 1, to the closed valve position, broken line 28, in a relatively short time interval, for example, a fraction of a second as compared to 27 seconds for a screw operated valve. Magnetically coupled valve members are not suitable because of the relatively high risk of slippage of the valve member in the presence of sudden pressure surges. Also the valve member 30 needs to be repetitively and accurately placed in the desired closed state and to be capable of remaining in that closed state in the presence of such pressure surges.

It can be shown that the forces on the valve member 30 are the greatest when the pivots Q and P and the axis 58 are aligned along axis 60 in the 0° and 180° positions and when the connecting rod length is much greater than that of the crank arm 52. In the drawing figures, the relative dimensions of the connecting rod to crank arm lengths shown are only for simplicity of illustration and may differ significantly from that shown.

In FIG. 4, the mechanism of FIG. 1 is schematically shown as a force diagram to illustrate the relatively high closing forces on the valve member 30 and valve stem 38 when arm 52 is in the 180° position. The primed reference numerals in FIG. 4 refer to parts of the same unprimed reference numerals in FIGS. 1 and 2. The force $F_P$ created by ratchet wheel 68' of ratchet motor 34, which in one embodiment, may be about 50 lbs., is applied by crank 52' to pivot P normal to crank 52' and is constant for all crank angles $\alpha$. The force $F_P$ creates at pivot P a force $F_{PQ}$ which is applied to pivot Q by connecting rod 54'. The force $F_{PQ}$ is determined as follows:

$$F_{PQ} = F_P \sec \theta, \quad (1)$$

(which is equivalent to:

$$F_{PQ} = (F_P / \cos \theta) \quad (2)$$

where $\theta$ is 180°-$\alpha$-$\beta$-90°, $\alpha$ is the angle between crank 52' and axis 60, and $\beta$ is the angle between rod 54' and axis 60.

As $\alpha$ approaches 0°, $\beta$ approaches 0° and $\theta$ approaches 90°, cosine $\theta$ approaches zero, and $F_{PQ}$ approaches infinity. The same occurs when $\alpha$ approaches 180°. When $\alpha$ is 45°, cosine $\theta = 1$ because $\theta$ is 0° at this point and $$F_P = F_{PQ}. \quad (3)$$

When crank 52' is in the 180° position, the force $F_{PQ}$ on valve stem 38' is a maximum, parallel to axis 60 and the valve is fully seated. Rotation of crank 52' 180° fully opens the valve. That rotation can occur relatively rapidly, within one-half revolution of crank 52'. Thus, the drive forces on the stem 38' produced by the crank 52' are the lowest at midregion of the two extreme opened (0°) and closed (180°) positions. By making the connecting rod 54' as long as possible, as mentioned above, for a given $\alpha$, $\beta$ is made smaller, resulting in a greater value of $\theta$. This greater value of $\theta$ reduces the value of cosine $\theta$, making $F_{PQ}$ greater for that value of $\alpha$.

In FIG. 1, there is little structural resistance to member 30 during opening and closing in the intermediate valve positions and therefore it does not matter that a relatively weaker force is used to move valve member 30 at that time. The relatively low forces produced by the crank drive 36 during midtravel of the valve member 30 between its closed and opened states are thus immaterial to the system operation. What is significant is that the crank drive 36 moves the valve member 30 relatively rapidly between the closed and opened states, e.g., one-half cycle of the crank 52 and shaft 54 rotation to preclude undesirable escape of significant amounts of the gas whose pressure is being controlled.

In FIG. 2, ratchet motor 34 is secured to stanchion 66 on support 41'. A ratchet motor is used because its pawl prevents slippage under load which is important in a valve system exposed to relatively high gas pressures. It also provides accurate valve seating along axis 60 without slippage or "coasting" of the valve member and without the temperature sensitive problems created by lubricants as mentioned above. Lubricants need not be used in this structure.

Stanchion 66 rotatably supports ratchet wheel 68 via shaft 59. Crank 52 is secured at one end to and rotated by shaft 59. Wheel 68 has a plurality of identical ratchet teeth 70 of uniform spacing. Pawl 72, which engages the teeth 70 one at a time, is connected to pawl arm 74. Arm 74 is resiliently pulled in directions 76 and 88 by respective tension springs 78 and 86 secured to support 41'. Arm 74 is pivotally connected at one end 74' to an end of solenoid 90 armature 84. Tension spring 86 resiliently engages pawl 72 with a tooth, e.g., tooth 70'.

Solenoid 90, when energized by drive circuit 98, pulls armature 84 in direction 92 opposite direction 76, with armature 84 being pivotally secured at pivot 94 to solenoid housing 96. Displacement of the armature 84 in direction 92 displaces pawl 72 one tooth to engage tooth 70". Upon deenergization of the solenoid 90, spring 78 immediately pulls pawl 72 in direction 76, creating force $F_P$ at crank 52 pivot P, while rotating ratchet wheel 68 in direction 56 an increment of one ratchet tooth. Pawl 72 is pulled in direction 76 until it abuts stop 77 secured to support 41'. Stop 77 is spaced relative to wheel 68 to insure wheel 68 and pawl 72 remain engaged.

In FIG. 2, antireverse spring mechanism 69 is secured to support 41' and includes springs 73 which engage teeth 70. The springs 73 act as an escapement to prevent the ratchet wheel 68 from rotating in a direction opposite direction 56 while permitting rotation in direction 56.

Circuit 98 supplies a serial stream of pulses to solenoid 90 in predetermined time intervals to repetitively energize and deenergize the solenoid coil 90' and repetitively displace armature 84 in directions 92 and 76. The pulses in a given stream are separated by a time interval sufficient for spring 78 to pull pawl 72 in direction 76 until pawl 72 engages stop 77. At the end of one pulse cycle, the next succeeding pulse drives pawl 72 to the left one tooth, repeating the process. The stream of pulses are supplied by drive circuit 98 in a time interval sufficient to either fully open the valve so that the member 30 is positioned as shown at line 26, FIG. 1, or fully close the valve as shown at line 28.

In one embodiment, FIG. 3, circuit 98 includes an opaque disc 100 secured to shaft 59. Disc 100 has two diametrically opposite peripheral slots 102 and 104. A light emitter 106 is on one side of disc 100 and a light sensor 108 is on the opposite side of disc 100 adjacent to emitter 106. When either of the slots 102 and 104 is between the emitter 106 and sensor 108, that slot passes light from the emitter to the sensor. The sensor 108 senses the emitted light and, in response, produces an output signal on line 110 to open normally closed switch 116.

Emitter 108 is powered d.c. power source 112 coupled to a reference potential, e.g., system ground. Power source 112 supplies power to amplifier 114, normally closed switch 116, and pulse generator 118. Switch 116 selectively opens in response to different input signals on lines 110, 120 and on other input lines (not shown). Pulse generator 118 supplies a serial stream of pulses to line 122. These pulses are applied to amplifier 114 through normally closed switch 116 via amplifier input line 124. The amplifier 114 output signal comprising an amplified serial stream of pulses is supplied to solenoid coil 90', FIG. 2, on line 126. Coil 90' lead 91 is coupled to system ground. Switch 116, when opened, stops the flow of the pulses to amplifier 114, cutting off solenoid 90, FIG. 2.

Slots 102 and 104 coincide, respectively, with the fully opened valve state (ratchet wheel 68, 0° position, FIG. 4) and the fully closed valve state (ratchet wheel 180° position, FIG. 4) of valve member 30, FIG. 1, to insure the valve is closed accurately. Slot 104 when aligned with emitter 106 and sensor 108 thus corresponds to the alignment of the pivots Q and P on axes 58 and 60 and with crank arm 52 and connecting rod 54 overlapping at the lowermost position 62, dashed, FIG. 1.

Override command 128, FIG. 3, provides a command signal on line 120 to move valve member 30 from its fully opened or fully closed positions. Override command 128 may include circuitry coupled to a sensor system (not shown) for sensing the hull pressure, for example, at skin 12. Should the hull pressure undesirably increase, then a command signal may open the valve assembly 10 releasing the hull gas, reducing hull pressure.

Command 128 supplies a brief command signal to switch 116 to override the open switch signal on line 110 from sensor 108. This action thus moves the slots 102 or 104 from between the emitter 106 and sensor 108. Command 128, for example, can cut off the sensor open signal on line 110 by generating a switch close signal on line 120. By closing switch 116, pulses from generator 118 are supplied amplifier 114 to drive solenoid 90, FIG. 2. This action rotates the ratchet wheel 68 in direction 56. The slots are thus displaced from the aligned position with emitter 106 and sensor 108. Command 128 may include a telemetry command system located in a ground station (not shown) and in the airborne aerostat for transmitting the desired control signal to the receiving circuitry (not shown) located in the aerostat.

The telemetered command signal may be transmitted to meet any desired set of conditions as enumerated above. A signal from command 128 is employed to open or close the valve assembly 10, FIG. 1. That signal closes switch 116 which supplies pulses to the solenoid drive circuit 90, FIG. 2, rotating wheel 68 and opening or closing valve assembly 10, as required. Once the emitter light is blocked by disc 100, the override command signal terminates. The command signal has a duration which permits a sufficient number of pulses to be supplied solenoid 90 to rotate the disc 100 and the corresponding slots 102 and 104 from between the emitter and sensor to cut off light to sensor 108. By way of example, the disc may be rotated an angular extent of about two ratchet teeth. The system then continues to automatically generate pulses until a slot 102 or 104 stops the action. Assuming slot 102 corresponds to the opened valve position as mentioned above, when slot 102 reaches the position between the emitter and sensor, sensor 108 generates a signal on line 110 which opens switch 116, stopping wheel 68, the command signal having previously terminated.

The valve may be left open for a predetermined time interval as known in this art for discharging gas from the corresponding chamber a given amount. At the end of that time interval, a signal from override command 128 closes switch 116 for a sufficient time interval to rotate disc 100 an amount to block the emitter and pass pulses to solenoid 90 at which time the command signal again terminates. The disc 100 is continued to be driven until slot 104 is aligned with the emitter and sensor, opening switch 116 and stopping the ratchet wheel 68, this time in the closed valve state. The slot dimensions and the emitter and sensor characteristics can be such to provide the desired accurate positioning of the valve member 30 in the closed valve state.

The valve assembly 10 is shown for use in an aerostat system; however, it should be apparent that this valve assembly may be employed in other kinds of systems. Also, it should be understood that valve members other than a dome-like member 30 may be employed. Low power motors other than a ratchet motor may be used in other kinds of implementations. In this embodiment, a motor is driven in connection with a magnetic solenoid; it is to be understood that other mechanical systems may be employed in other implementations which may be hydraulically or spring operated.

What is claimed is:

1. A valve apparatus comprising:
    motor means including a shaft for rotation about an axis, said motor means producing a rotational force on said shaft of a first magnitude relative to said axis;
    valve means having open and closed valve states and including a linearly displaceable valve member, said closed state requiring a linear closing force of a second magnitude substantially greater than the first magnitude, said first magnitude being insufficient to place said valve means in said closed state; and
    crank means coupled to said valve member and said shaft for translating said relatively low first magnitude force into a linear valve closing force having a magnitude of at least said second magnitude in said closed valve state and for linearly moving the valve member to place said valve means in said closed and open states in a period less than one revolution of said shaft.

2. The valve apparatus of claim 1 wherein said motor means includes a ratchet and pawl means for providing said force of said first magnitude.

3. The valve apparatus of claim 1 wherein said crank means includes a crank connected to said shaft for rotation therewith about said axis, and a connecting rod pivotally connected to said valve means and to said crank for reciprocating said valve means in a direction normal to said axis.

4. The valve apparatus of claim 1 wherein said motor means includes spring means coupled to said shaft for producing said force of said first magnitude.

5. Valve apparatus comprising:
    ratchet and pawl means for incrementally rotating a ratchet about an axis;
    valve means including a valve member and a valve seat, said member being adapted to engage said seat when moved in a given linear direction normal to said axis; and
    link means including a pair of links each having first and second ends, one link first end being secured to said ratchet for rotation therewith about said axis, the other link first end being pivotally secured to said valve member, the second ends of the links being pivotally connected, said axis and the pivots of said links all being aligned in a straight line substantially parallel to said direction in the closed valve state with the links juxtaposed on that straight line and in an angular position other than a straight line as the valve member is opened linearly.

6. The apparatus of claim 5 wherein said other link has a length substantially greater than the length of the one link.

7. The apparatus of claim 5 wherein said ratchet and pawl means includes a solenoid coupled to a pawl, said pawl being normally engaged with a tooth of said ratchet, said solenoid moving said pawl into engagement with a selected tooth different than the engaged tooth in response to an applied pulse and spring means coupled to said pawl for moving the pawl and thus the selected tooth to rotatably drive the ratchet upon termination of said applied pulse, and stop means coupled to said ratchet for stopping said rotation at the end of a given angular increment.

8. The apparatus of claim 5 wherein said valve means includes a valve stem connected to the valve member and guide means for guiding the valve stem in said given linear direction.

9. Valve apparatus comprising:
    a ratchet motor including a ratchet wheel rotatable about an axis and having a plurality of teeth around its peripheral edge and pawl means engaged with at least one ratchet tooth for incrementally rotating said wheel in response to a control signal applied as an input thereto;
    valve means including a valve member adapted to engage a valve seat lying in a plane, said valve member moving in a given linear direction normal to said plane; and
    crank means operatively coupling said member to said wheel for operating said valve means in response to the rotation of said wheel, said crank means including a crank and a connecting rod, said crank being fixed at one end to said wheel, said rod being pivotally connected at one end to said valve member for rotation about a first pivot axis, the other end of said crank and rod being pivotally connected for rotation about a second pivot axis, all said axes being aligned on a straight line substantially parallel to said given direction in one angular orientation of said wheel with said crank and connecting rod juxtaposed on that straight line, said valve means being closed when said crank and rod are in said one angular orientation, said crank and rod being in an angular position other than in a straight line as the valve member is opened linearly.

10. The apparatus of claim 9 wherein said valve seat is a planar ring member and said member comprises a dome-shaped element, said member including a valve stem secured to said element and to said rod for moving said element in response to the rotation of said wheel.

11. The apparatus of claim 9 wherein said pawl means includes a solenoid and spring means coupled to a pawl engaged with at least one of said teeth, said solenoid in response to said control signal being adapted to move said pawl into engagement with a second tooth, said spring means for displacing said pawl and causing said second tooth and said wheel to rotate about a third axis.

12. The apparatus of claim 9 further including control signal generating means for generating a plurality of pulses, said pawl means including means responsive to said pulses applied thereto for rotating said wheel, each pulse for rotating said wheel an angular extent of one tooth.

13. A valve apparatus comprising:

a valve seat;

a valve member adapted to abut said seat in the closed valve state;

valve stem means connected to said valve member for guiding the member parallel to a given linear direction when the valve is closed and opened in accordance with the direction said stem is moved;

ratchet motor means including a shaft rotatable about an axis normal to said given direction for angularly incrementing said shaft about said axis;

a crank secured at one end to said shaft for rotation by said shaft about said axis in response to operation of said motor means; and a connecting rod pivotally secured at one end to the crank and to said stem at the other end at respective first and second pivots, the axis and pivots being aligned in a straight line when said valve is closed in one aligned position with the rod and crank juxtaposed on that straight line and opened linearly to a second aligned position with the crank and rod aligned in a straight line end-to-end.

14. The apparatus of claim 13 wherein said motor means includes means responsive to an electrical pulse applied as an input thereto, said apparatus further including control means for generating a stream of said pulses for opening and closing said valve, sensor means coupled to said motor and control means for cutting off said pulse stream when said valve is closed and open, and command means coupled to said control means for overriding said sensor means and causing said control means to generate said pulse stream in response to a given command.

* * * * *